United States Patent Office 3,455,847
Patented July 15, 1969

3,455,847
POLYMERIZATION OF EPOXIDES USING A NEW CATALYST DERIVED FROM THE REACTION OF ORGANOZINC WITH NITROSO COMPOUND
Junji Furukawa, Kyoto-shi, Nariyoshi Kawabata, Osaka-shi, and Mikio Nakaniwa, Akihiro Kawasaki, and Iwao Kameoka, Kyoto-shi, and Naomichi Takemura, Chiba-ken, and Hitoshi Ohashi and Tsuneto Nishiyama, Kyoto-shi, Japan, assignors to Maruzen Petrochemical Co., Ltd., Tokyo, Japan, a corporation of Japan
No Drawing. Filed Aug. 23, 1966, Ser. No. 574,314
Claims priority, application Japan, Aug. 25, 1965, 40/51,488; July 29, 1966, 41/44,421
Int. Cl. C08g 23/06
U.S. Cl. 260—2                                    19 Claims

ABSTRACT OF THE DISCLOSURE

Process for the preparation of polyepoxides by polymerizing at least one monomeric epoxide wherein the epoxy group is an oxirane ring, characterized by the use of a new catalyst consisting essentially of a reaction product obtained by reacting in an inert atmosphere at a temperature of −78° C. to room temperature an organozinc compound such as di-lower alkyl zinc or diphenyl zinc with a nitroso compound, typically nitrosobenzenes, nitrosotoluenes, nitrosocyclohexanes, nitrosoparaffines and the like in a molar proportion of about 1:0.20 to 1.50.

The present invention relates to a new and improved process of polymerizing epoxides and is particularly concerned with the use of a novel catalyst for preparing high molecular weight polyepoxides.

It has already been proposed that various catalyst systems comprising a dialkylzinc in combination with a compound having active hydrogen may be used for the polymerization of propylene oxide. Among these catalysts, for instance, there may be exemplified a reaction product of a dialkylzinc with water and a reaction product of a dialkylzinc with a polyol. The active species of these catalysts may be considered to be reaction products of a dialkylzinc with an electron donor containing active hydrogen. However, these catalyst systems tend to become heterogenous and to lower or lose their catalytic activities during the polymerization in which they are used. Further, they only give relatively low molecular weight polymers of propylene oxide having intrinsic viscosity of about 5 to 11.

According to the present invention, we provide a process for the polymerization of epoxides which comprises polymerizing at least one epoxide in the presence of a catalyst comprising a reaction product of an organozinc compound with a nitroso compound.

The novel catalyst to be used according to the present invention is in a homogeneous state and has further advantages that the catalytic activity thereof is rather high at elevated temperatures and does not lower even after subjecting said catalyst to a high temperature treatment for a long period.

According to the present invention, the polymerization reaction may be conducted very smoothly and polyepoxides having much higher molecular weights than those obtained by known processes may be obtained. For instance, using as catalyst a reaction product of diethylzinc with nitrosobenzene, propylene oxide may be smoothly polymerized at 70° C. to give a high molecular weight polymer having intrinsic viscosity as high as 21.6 with a high yield of more than 85%.

Nitroso compounds to be used for preparing the catalyst of the present invention may be any of aliphatic, aromatic and cycloaliphatic nitroso compounds having at least one nitroso group in their molecule or dimers thereof. Typical examples of nitroso compounds include nitrosobenzenes such as nitrosobenzene and 1,3-dinitrosobenzene; nitrosotoluenes such as 2-nitrosotoluene, 3-nitrosotoluene and 4-nitrosotoluene; nitroso-derivatives of polymethylbenzenes such as 3-nitroso-1,2-dimethylbenzene, 2-nitroso - 1,4 - dimethylbenzene and 2-nitrosomesitylene; N,alkylphenyl-nitrosoamines such as dimethyl nitrosoamine, diphenyl nitrosoamine and methylphenyl nitrosoamine; nitrosoanisoles such as 3-nitrosoanisole; nitrosoanilines such as p-nitroso-N,N-dimethylaniline; nitrosobenzaldehydes such as o-, m- and p-nitrosobenzaldehydes; nitroso-derivatives of benzene carboxylic acid esters such as o-, m- and p-nitrobenzoic acid esters, nitrosocyclohexane such as 1-chloro-1-nitrosocyclohexane; nitrosoparaffines and their halogeno-derivatives such as nitrosomethane, nitrosoethane, 2-nitrosopropane, 2-nitrosobutane, tertiary nitrosobutane, 1-chloro-1-nitrosomethane, trifluoronitrosomethane and 2-bromo-2-nitrosopropane; and alkyl nitrites such as ethyl nitrite.

Any organozinc compound reacted with the nitroso compounds may be used as catalyst for the polymerization of epoxides in accordance with the present invention. Typical examples of the organozinc compounds which may be used include dialkylzinc such as dimethylzinc, diethylzinc, di-n-propylzinc, di-isopropylzinc, di-n-butylzinc etc. and diphenylzinc.

The activity of said catalyst prepared by the reaction of organozinc compound with nitroso compound in accordance with the present invention may vary with the change of kinds and proportions of catalyst components. It is preferred, in general, for the preparation of catalyst to use the nitroso compound in an amount of about 0.20 to 1.50 moles per mole of organzinc compound.

The preparation of catalyst, that is, the reaction of organozinc compound with nitroso compound may be carried out in the absence of a diluent, but the presence of a diluent for the nitroso compound is preferred to conduct the reaction smoothly and to obtain a homogeneous catalyst system. Any diluent which is inert under the reaction conditions may be used. The use as inert diluent of aliphatic hydrocarbons such as butane, pentane, hexane, heptane, octane etc., aromatic hydrocarbons such as benzene, toluene, xylene tetralin etc., cycloaliphatic hydrocarbons such as cyclohexane, Decalin etc., aliphatic or cycloaliphatic ethers such as ethylether, butylether, dioxane, tetrahydrofuran, 1,2-dimethoxyethane etc. may be preferred. The preparation of catalyst may be carried out in the presence of epoxy compound to be polymerized. The temperature for the preparation of catalyst may vary within a wide range. Since, however, the reaction between the organozinc and nitroso compounds is relatively violent and exothermic, it is desirable to use the temperature range of −78° C. to room temperature in such a manner that a diluted organozinc solution in an appropriate diluent is added to a diluted nitroso compound solution in the same diluent. The catalyst in solution thus obtained may be used as it is in the polymerization of epoxides. If, however, such a freshly prepared catalyst is insufficient in its activity, it is particularly preferred to pre-treat the catalyst at a high temperature to enhance the activity thereof to the maximum. The temperature for said pre-heat treatment may vary within a wide range, but it is usually sufficient to carry out the treatment at a temperature of 70–100° C. for one to one and a half hours to achieve a desired result. It should be noted as surprising characteristics of the present invention over the prior art that the catalyst thus prepared is completely homogeneous and stable and nevertheless has a significantly high activity for the polymerization of epoxides.

The exact nature and the structure of the reaction products of organozinc with nitroso compound are not known, but in order to obtain the catalyst having excellent activity for the polymerization of epoxides the molar ratio of nitroso compound to organozinc compound to be used seems critical. The reaction involved may be considered to be addition reaction, complex-forming reaction and subsequent substitution reaction, the degree of respective reaction varying with the reaction conditions. It is a further characteristic feature of the present invention that the catalyst thus prepared does not lose its activity even after a relatively long storage of more than two months at room temperature.

Any epoxide may be homopolymerized or copolymerized with a second epoxy compound by the process of the present invention with improved results. Typical examples of epoxides which may be homopolymerized or copolymerized are ethylene oxide; mono- and di-substituted ethylene oxides

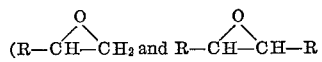

where R stands for a hydrocarbon radical such as alkyl, aryl, cycloalkyl etc., for instance alkylene oxides such as propylene oxide, 1-butene oxide, isobutylene oxide etc. and substituted alkylene oxides such as cyclohexene oxide, styrene oxide, phenyl glycidyl ether, biphenol glycidyl ether etc.; halogen-containing epoxides, for instance epichlorohydrin, epibromohydrin, epifluorohydrin, trifluoroethylene oxide, perfluoropropylene oxide etc.; unsaturated epoxides, for instance allyl glycidyl ether, vinyl glycidyl ether, vinylcyclohexene mono- or di-oxide etc.

The polymerization reaction may be carried out by any desired means, either as a batch or a continuous process with the catalyst added all at one time or intermittently during the polymerization or continuously throughout the polymerization. If necessary, the monomer or monomers may be added gradually to the polymerization system. The polymerization may be carried out without diluent, but it is usually preferable to use an inert diluent which is conveniently the same one as used in the preparation of catalyst. The temperature and pressure conditions for the polymerization according to the present invention may vary within wide ranges. Usually, the polymerization may be carried out at a temperature from −70° C. to 200° C., preferably from 0° C. to 100° C. and under autogenous pressure. If desired, a subatmospheric or a superatmospheric pressure may also be used.

The following examples will further illustrate the process for polymerizing various epoxides in accordance with the present invention in which all parts and percentages are by weight.

Example 1

Into a 40 cc. glass polymerization tube filled with nitrogen, was charged 0.5 cc. of a nitrosobenzene solution which was previously prepared under nitrogen atmosphere by dissolving 4.7030 g. (0.0439 mole) of nitrosobenzene into toluene to obtain the total volume of 50 cc. The solution was cooled to −78° C. and 1.0 cc. of a diethylzinc solution which was prepared by dissolving 5.1 cc. (0.05 mole) of diethylzinc into toluene to obtain the total volume of 50 cc. was added thereto. Immediately on the addition of diethylzinc solution, the colour of nitrosobenzene solution was changed from green into dark red. The glass tube was heated in a hot water bath at 100° C. for 1.5 hours under a moisture free condition. During the heating, the colour of contents of the tube was changed into pale orange. After the completion of heating, the reaction mixture was allowed to stand until it was warmed up to room temperature, where the reaction mixture was quite homogeneous.

The catalyst thus obtained has the molar ratio of nitrosobenzene to diethylzinc of 0.45:1. To this catalyst solution was added, under nitrogen atmosphere, 18.5 cc. of toluene and the mixture was cooled to −78° C. Then, 7.0 cc. (0.1 mole) of propylene oxide was added to the catalyst system thus obtained and the tube was sealed and maintained at 70° C. for 126 hours, during which the mixture gradually became viscous and finally solidified. At the end of this period, a sufficient amount of benzene was added to the polymer thus formed to give a low viscosity solution easy to handle and a small amount of methanol was then added to destroy the catalyst. The mixture was centrifuged to remove solid matters therefrom and the liquid portion was freeze-dried. The polymer thus obtained was a pale yellow or nearly white rubbery elastomer. The polymer weight 5.014 g. and the yield thereof was 86.3%. The poly(propylene oxide) thus obtained was a tough and elastic material, but was nonsticky and has the intrinsic viscosity at 30° C. of benzene solution of 21.6 and acetone-insoluble matter at 0° C. of 15.6% on the total weight thereof.

Example 2

The same procedure as described in Example 1 was repeated except that the addition amount of nitrosobenzene was 0.25 cc. and the polymerization was run for 72.3 hours. The polymer was obtained in the yield of 79.4% and was a white elastic mass having the intrinsic viscosity at 30° C. of benzene solution of 20.3.

Example 3

The same procedures as described in Example 1 were repeated except that the addition amount of nitrosobenzene was varied and the polymerization was run for 20.0 hours and the results obtained, i.e. the amount of polymer formed, conversion and intrinsic viscosity thereof are shown in Table 1.

TABLE I

| Amount of nitrosobenzene solution in toluene (0.50 mols/l.) | Molar ratio of nitrosobenzene/ diethylzinc | Amount of toluene (cc.) | Amount of propylene oxide (cc.) | Polymer conversion (percent) | Intrinsic viscosity |
|---|---|---|---|---|---|
| 0 | 0 | 19.0 | 7.0 | 0 | |
| 0.20 | 0.1 | 18.8 | 7.0 | 1.0 | |
| 0.50 | 0.25 | 18.5 | 7.0 | 1.9 | |
| 0.80 | 0.4 | 18.2 | 7.0 | 44.0 | 13.5 |
| 1.0 | 0.5 | 18.0 | 7.0 | 55.1 | [1] 14.2 |
| 1.20 | 0.6 | 17.8 | 7.0 | 14.0 | 14.7 |
| 1.40 | 0.7 | 17.6 | 7.0 | 23.3 | 15.0 |
| 1.45 | 0.725 | 17.6 | 7.0 | 8.1 | 9.5 |
| 1.5 | 0.75 | 17.5 | 7.0 | 6.0 | 9.8 |
| 1.8 | 0.9 | 17.2 | 7.0 | 7.0 | |
| 2.0 | 1.0 | 17.0 | 7.0 | 3.2 | |

[1] Acetone-insoluble matter at 0° C.: 16.0%.

Example 4

A polymerization was carried out in accordance with the procedure as in Example 1 except that the catalyst was used without heat-treating after the preparation thereof. The polymer thus obtained weighed only 0.1633 g. and the yield was 2.8%.

Examples 5–12

These examples demonstrate the polymerization of propylene oxide using the same procedure as in Example 1 except that various nitroso compounds are used in place of nitrosobenzene. The results obtained are shown in Table II.

tion was conducted at 70° C. for 64.5 hours, during which the mixture gradually became viscous and finally

TABLE II

| Ex. No. | Nitroso compound | Concentration of nitroso compound (mol/l.) | Amount of nitroso compound (cc.) | Molar ratio of nitroso compound diethylzinc | Amount of propylene oxide (cc.) | Amount of toluene (cc.) | Polymerization period (hours) | Polymer conversion (percent) | Intrinsic viscosity |
|---|---|---|---|---|---|---|---|---|---|
| 5 | P-nitroso toluene | 0.99 | 0.25 | 0.49 | 3.5 | 9.3 | 47 | [1] 24.6 | 9.1 |
| 6 | α-nitroso-β-naphthol | 0.36 | 0.75 | 0.27 | 3.5 | 8.8 | 22 | [2] 46.6 | 18.0 |
| 7 | N-nitroso diphenyl amine | 0.499 | 1.50 | 0.75 | 7.0 | 17.5 | 89 | 14.5 | 12.7 |
| 8 | N-nitroso dimethyl amine | 1.00 | 2.0 | 2.0 | 7.0 | 17.0 | 89 | 6.3 | 4.7 |
| 9 | Nitroso cyclohexane | 0.50 | 0.75 | 0.75 | 3.5 | 8.8 | 24 | 12.6 | 6.8 |
| 10 | 2-bromo-2-nitroso propane | (4) | 0.25 | 0.25 | 7.0 | 18.8 | 72 | [3] 27.2 | 9.4 |
| 11 | Ethylnitrite | 1.0 | 0.75 | 0.75 | 7.0 | 18.3 | 36 | 49.0 | 5.4 |
| 12 | P-nitroso N,N-dimethyl aniline | (5) | | 0.50 | 7.0 | 19.0 | 24 | 60.9 | 17.0 |

[1] Acetone-insoluble matter at 0° C.: 23.0%.
[2] Acetone-insoluble matter at 0° C.: 43.8%.
[3] Acetone-insoluble matter at 0° C.: 16.6%.
[4] 1.529/10 cc.
[5] 0.075 g.

Example 13

A catalyst was prepared by using the same procedure as in Example 1 except that 1.0 cc. of nitrosobenzene was used.

The catalyst thus prepared was cooled in a glass polymerization tube to −78° C. and then 18.0 cc. of toluene and 5.1 cc. of ethylene oxide were charged thereto. The tube was sealed and the polymerization was carried out at 70° C. for 18.3 hours. After the completion of polymerization reaction, the tube was opened, the catalyst was destroyed by the addition of methanol and the polymer thus obtained was washed with petroleum ether and dried. 4.341 g. of poly(ethylene oxide) having the intrinsic viscosity at 30° C. of acetonitrile solution of 39.0 was obtained.

solidified. Poly(allylglycidylether) finally obtained weighed 0.86 g. (yield 14.8%) and was sticky solid mass. Ether- and methanol-soluble portion of the polymer was 0.66 g. (11.4%) and the remainder was ether- and acetone-insoluble matters. The reduced viscosity of the ether-soluble matter was 2.0 when determined with respect to 0.1% solution in cyclohexanone.

Examples 16–20

These examples demonstrate the copolymerization of various epoxy compounds using the same catalyst as in Example 15 and using the general procedure as in Example 14 except that the temperature and time conditions of polymerization were varied as shown below. The results obtained are also shown in Table III.

TABLE III

| Example No. | Monomer Names | Total moles | Molar ratio | Amount of toluene (cc.) | Reaction conditions | Total polymer Yield (g.) | Total polymer Conversion (percent) | Solvent-treated polymer Conversion (percent) | Solvent-treated polymer Reduced viscosity |
|---|---|---|---|---|---|---|---|---|---|
| 16 | Propylene oxide, Allylglycidylether | 0.05 | 1:1 | 9.0 | 70° C., 77 hrs | 2.20 | 63.6 | [1] 48.0 | [2] 1.3 |
| 17 | Ethylene oxide, Allylglycidylether | 0.05 | 4:1 | 9.0 | 70° C., 74 hrs | 0.93 | 31.9 | [3] 31.9 | [2] 5.3 |
| 18 | Ethylene oxide, Epichlorhydrin | 0.05 | 4:1 | 9.0 | 70° C., 14.5 hrs | 0.49 | 18.3 | [3] 18.3 | [4] 2.0 |
| 19 | Propylene oxide, Ethylene oxide | 0.05 | 4:1 | 9.0 | 70° C., 68 hrs | 1.49 | 54.0 | [5] 40.0 | [4] 2.0 |
| 20 | Propylene oxide, Ethylene oxide | 0.05 | 1:4 | 9.0 | 70° C., 67 hrs | 1.53 | 65.1 | [5] 57.2 | [4] 1.6 |

[1] Ether-soluble polymer.
[2] Reduced viscosity determined in respect of 0.1% solution in benzene at 25° C.
[3] n-Heptane-insoluble polymer.
[4] Reduced viscosity determined in respect of 0.1% solution in chloroform at 25° C.
[5] Acetone-soluble polymer.

Example 14

Ethylene oxide was polymerized by using the same procedure as in Example 13 except that 0.5 cc. of nitrosobenzene solution was used and the polymerization was run at 30° C. for 8 days. The poly(ethylene oxide) obtained weighed 4.400 g. and had the reduced viscosity at 30° C. of acetonitrile solution of 80.3. Reduced viscosity determined in respect of the concentration of 0.0372 g./dl. in acetonitrile solution.

Example 15

A catalyst was prepared in accordance with the general procedure described in Example 1 except that 0.5 cc. of nitrosobenzene solution prepared by dissolving 5.3556 g. (0.05 mole) of nitrosobenzene into toluene to obtain the total volume of 100 cc. and 0.5 cc. of diethylzinc solution prepared by dissolving 5.1 cc. (0.05 mole) of diethylzinc into toluene to obtain the total volume of 50 cc. were used and the heat-treatment of catalyst was carried out at 100° C. for 2 hours.

The catalyst thus obtained has the molar ratio of nitrosobenzene to diethylzinc of 0.5:1. To this catalyst solution was added, under nitrogen atmosphere, 9.0 cc. of toluene and 6.0 cc. (0.05 mole) of allylglycidyl-ether. The polymerization tube was sealed and the polymeriza- In Example 16, the isolation of copolymer formed was made by adding sufficient amount of ether to the reaction product to give a low viscosity solution easy to handle, separating the soluble portion from the insoluble portion after several days and removing the ether from the soluble portion. The copolymer thus obtained was a rubbery elastomer.

In Examples 17 and 18, the isolation of copolymers formed was made by adding n-heptane in ten times volume to precipitate the copolymer. The copolymer obtained in Example 17 was a rubbery elastomer and the copolymer obtained in Example 18 was a paste-like semi-solid.

In Examples 19 and 20, the isolation of copolymer formed was made by adding sufficient amount of acetone containing 2% of water to the reaction product to give a low viscosity solution easy to handle, centrifuging the mixture after several days to remove the acetone-insoluble matter and removing the acetone. The copolymers obtained in both Examples 19 and 20 were rubbery elatomers.

What we claim is:
1. A process for the preparation of polyepoxides which comprises polymerizing at least one monomeric epoxide having an oxirane ring in an inert atmosphere in the presence of a catalyst consisting essentially of a reaction product obtained by reacting in an inert atmosphere an organozinc compound selected from the group consisting of di-lower alkylzincs and diphenylzinc with a nitroso compound selected from the group consisting of nitrosobenzenes, nitrosotoluenes, nitroso-derivatives of polymethylbenzenes, N,N-disubstituted N-nitrosoamines, nitrosoanisoles, N,N-dialkyl-substituted nitrosoanilines, nitrosobenzaldehydes, nitroso-derivatives of benzene carboxylic acid esters, nitrosocyclohexane and its chloro-derivative, nitrosoparaffines and their halogeno-derivatives and alkyl nitrites, the molar ratio of the organozinc compound to nitroso compound being in the range of 1:0.20 to 1:1.50.

2. A process as claimed in claim 1 wherein the reaction of the organozinc compound with the nitroso compound is carried out prior to contact with the epoxide to be polymerized.

3. A process as claimed in claim 1 wherein the reaction of organozinc compound with nitroso compound is carried out in the presence of epoxide to be polymerized.

4. A process as claimed in claim 1 wherein the reaction of organozinc compound with nitroso compound is carried out in an inert diluent.

5. A process as claimed in claim 4 wherein the inert diluent is selected from the group consisting of aliphatic, aromatic and cycloaliphatic hydrocarbons and aliphatic and cycloaliphatic ethers.

6. A process as claimed in claim 1 wherein the catalyst is heat-treated prior to the use for the polymerization.

7. A process as claimed in claim 6 wherein the heat-treatment is carried out at a temperature of 70 to 100° C. for 1 to 1.5 hours.

8. A process as claimed in claim 1 wherein the organozinc compound is diphenylzinc.

9. A process as claimed in claim 1 wherein the catalyst is the reaction product of diethylzinc and nitrosobenzene.

10. A process as claimed in claim 1 wherein the catalyst is the reaction product of diethylzinc and p-nitrosotoluene.

11. A process as claimed in claim 1 wherein the catalyst is the reaction product of diethylzinc and N-nitroso dimethylamine.

12. A process as claimed in claim 1 wherein the catalyst is the reaction product of diethylzinc and p-nitroso N,N-dimethylaniline.

13. A process as claimed in claim 1 wherein the epoxide to be polymerized is ethylene oxide.

14. A process as claimed in claim 1 wherein the epoxide to be polymerized is propylene oxide.

15. A process as claimed in claim 1 wherein the epoxide to be polymerized is allylglycidyl ether.

16. A process as claimed in claim 1 wherein ethylene oxide is copolymerized with epichlorohydrin.

17. A process as claimed in claim 1 wherein propylene oxide is copolymerized with epichlorohydrin.

18. A process as claimed in claim 4 wherein the reaction is carried out at a temperature of −78° C. to room temperature.

19. A process as claimed in claim 1 wherein propylene oxide is copolymerized with allylglycidyl ether.

References Cited

UNITED STATES PATENTS

| | | |
|---|---|---|
| 2,870,100 | 1/1959 | Stewart et al. |
| 3,135,706 | 6/1964 | Vandenberg. |

WILLIAM H. SHORT, Primary Examiner

T. PERTILLA, Assistant Examiner

U.S. Cl. X.R.

252—431; 260—47, 88.3